April 28, 1931. A. KÉGRESSE 1,802,656
ENDLESS TRACK VEHICLE
Filed Oct. 11, 1927
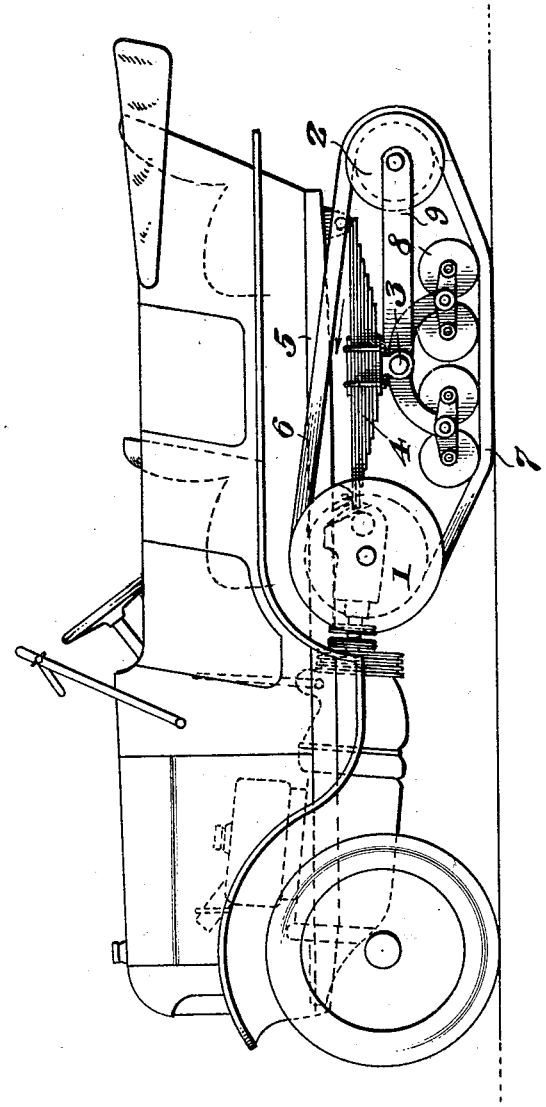
Inventor;
A. Kégresse
By Emil Bönnelycke
Atty.

Patented Apr. 28, 1931

1,802,656

UNITED STATES PATENT OFFICE

ADOLPHE KÉGRESSE, OF LEVALLOIS PERRET, FRANCE

ENDLESS-TRACK VEHICLE

Application filed October 11, 1927, Serial No. 225,532, and in France October 20, 1926.

As will be readily understood, in order to obtain a fast running vehicle driven by endless track belts and steered by means of steering wheels, an essential requirement is that such vehicle shall fulfill, as to suspension, certain conditions without which no speed is permissible.

Obviously, the wheel-carried steering axle of such a vehicle may be connected with the chassis by means of the suspension devices usual in automobile construction.

As concerns the driving part, constituted by the flexible track belts, the problem is more intricate, for, as persons skilled in the art are aware, a track belt set comprises driving pulleys coupled with the engine of the vehicle through the transmission gear, idle pulleys and a carrier train.

The problem is, therefore, to produce with these various parts a resilient suspension for the carrier portion in such a way that the oscillations from said suspension will not interfere with proper guiding of the endless belt either over the pulleys or under the carrier train.

My invention provides a vehicle designed to meet these requirements.

The single figure in the drawing appended hereto is a general view in elevation illustrating such a vehicle.

Referring more particularly to said drawing, 1 indicates a driving pulley fixed directly to the live axle of the vehicle which is itself attached to the chassis 5; 2 is a loose or idle pulley, 3 the supporting or dead axle and 4 the suspension springs that connect axle 3 with the chassis. The carrier train is indicated at 8 and is of the type ordinarily employed in connection with an endless track belt, as shown, for example, in my prior Patent No. 1,547,043 granted July 21, 1925, to which reference may be had.

A similar arrangement is, of course, provided on the opposite side of the vehicle.

With a vehicle so constituted, the endless belt runs in the direction pointed out by the arrow on the drawing, that is to say: the driving stretch 6 of the belt is the upper one, while the slack stretch 7 is the lower one.

A resilient connection 4 is provided between each end of the transverse supporting axle 3 and the chassis, and a carrier train 8 is connected to each end of said axle and bears upon the lower stretch of the respective belt.

An inspection of the drawing will show that when one of the two springs 4 sags, as influenced by ground bumps, the driving pulley 1 does not remain parallel to the vertical plane of the carrier train 8. There results, consequently, a twisting of the endless belt which, with my mounting, is immaterial since the stretch that frictionally engages the driving pulley 1 is the upper stretch 6, which alone is tight, for it freely reaches said pulley, being guided only by the idle pulley 2 located remote therefrom. The lower stretch 7 can without any inconvenience lend itself to departures from parallelism of the vertical planes of the driving pulley and of the carrier train 8, since said lower stretch is slack and, therefore, flexible.

The idle pulley 2 is connected with, and pivotally suspended from, the supporting axle 3 by means of a rearwardly-extending hanger arm 9, and its vertical plane thus remains always parallel with that of the carrier train, so that the endless flexible belt is correctly guided in all its positions.

It should be noted that, if the driving pulley 1 were positioned at the rear of the chassis, such a mounting could give no satisfactory results. As a matter of fact, under the influence of the spring oscillations, the parallelism of the vertical planes of the driving pulley 1 and of the carrier train 8 would then, as will be readily understood, undergo change, since said pulley is rigidly connected with the chassis through the live axle, while the carrier train is connected with the same by springs.

With the driving pulley at the rear, the lower stretch of the belt would then become the driving one, while the upper stretch would be slack; and the distance between the last roller of the carrier train and the driving pulley being very short, there would ensue a twisting of the tight portion of the belt which would entail slipping of the belt from its pulleys and would, besides, cause abnormal wear of the guide flanges or rims of the pulleys. In this same connection, however, it may be pointed out that the endless belt can be removed from its pulleys when required, whereas the driving pulley remains permanently connected to the chassis.

As will be apparent, in order to obtain a flexible, endless track belt driven vehicle adapted to run fast, the assembly of the various mechanical gears must be intelligently contrived to achieve satisfactory operation.

I claim as my invention:

A motor vehicle of the endless track belt type, designed to travel at high speeds and comprising, in combination with the engine, the chassis, and a transmission gear leading from the engine and connected to the chassis; a pair of front driving pulleys at opposite sides of the chassis connected to the transmission gear to be driven therefrom, a pair of idle pulleys at the rear of the chassis at opposite sides thereof, an endless flexible track belt connecting each driving pulley with the corresponding idle pulley, a transverse supporting axle whereto the two idle pulleys are articulated, said supporting axle being arranged below the chassis and extending midway between the pairs of driving and idle pulleys and through the spaces between the upper and lower stretches of the belts, a resilient suspension connection between each end of the supporting axle and the chassis, and a carrier train connected to each end of said supporting axle and bearing upon the lower stretch of the respective belt.

In testimony whereof I affix my signature.

ADOLPHE KÉGRESSE.